(12) United States Patent
Parrott

(10) Patent No.: US 11,593,453 B2
(45) Date of Patent: Feb. 28, 2023

(54) DEVICE, MEDIUM, AND METHOD FOR RETRIEVING OBJECT

(71) Applicant: GREE, INC., Tokyo (JP)

(72) Inventor: Jason Parrott, Tokyo (JP)

(73) Assignee: GREE, INC., Tokyo (JP)

( * ) Notice: Subject to any disclaimer, the term of this patent is extended or adjusted under 35 U.S.C. 154(b) by 591 days.

(21) Appl. No.: 14/674,833

(22) Filed: Mar. 31, 2015

(65) Prior Publication Data

US 2015/0286740 A1 Oct. 8, 2015

(30) Foreign Application Priority Data

Apr. 2, 2014 (JP) .............................. JP2014-076140
Nov. 4, 2014 (JP) .............................. JP2014-223991

(51) Int. Cl.
*G06F 16/958* (2019.01)
*G06F 40/143* (2020.01)

(52) U.S. Cl.
CPC .......... *G06F 16/986* (2019.01); *G06F 40/143* (2020.01)

(58) Field of Classification Search
CPC ..................... G06F 17/2247; G06F 17/30896
USPC ......................................................... 715/234
See application file for complete search history.

(56) References Cited

U.S. PATENT DOCUMENTS

| | | | | |
|---|---|---|---|---|
| 9,858,246 B1 * | 1/2018 | Singhal | .............. | G06Q 30/0643 |
| 2002/0131072 A1 * | 9/2002 | Jackson | .................. | H04L 29/06 358/1.15 |
| 2002/0184610 A1 * | 12/2002 | Chong | ...................... | G06F 8/20 717/109 |
| 2004/0110462 A1 * | 6/2004 | Forstadius | ........ | H04M 1/72525 455/3.01 |
| 2012/0249736 A1 * | 10/2012 | Barrett | ................. | H04N 13/139 348/E7.003 |
| 2014/0241629 A1 * | 8/2014 | Lerios | ...................... | G06T 9/00 382/166 |
| 2015/0095768 A1 * | 4/2015 | Rimmer | ................ | G06F 17/211 715/238 |

(Continued)

FOREIGN PATENT DOCUMENTS

| | | | | | |
|---|---|---|---|---|---|
| GB | | 2508138 A | * | 5/2014 | ............. H04L 67/06 |
| JP | | 2001-053916 | | 2/2001 | |

(Continued)

OTHER PUBLICATIONS

"CSS: How to Easily Hide Content On Only Mobile or Only Desktop"; Michael Habarle; <http://ageekandhisblog.com/css-how-to-easily-hide-content-on-only-mobile-or-only-desktop/>; Published Nov. 5, 2013.*

(Continued)

*Primary Examiner* — Stephen S Hong
*Assistant Examiner* — Broderick C Anderson
(74) *Attorney, Agent, or Firm* — Oblon, McClelland, Maier & Neustadt, L.L.P.

(57) ABSTRACT

A device configured to retrieve a markup language file; identify, based on the markup language file, an item to be used on a web page, address information for retrieving an object for the item, and an object type corresponding to the object; retrieve an evaluation result for the object; identify the object as an object to be used based on the evaluation (Continued)

result; identify address information of the object; and retrieve and execute the object based on the address information.

21 Claims, 6 Drawing Sheets

(56) References Cited

U.S. PATENT DOCUMENTS

2015/0302767 A1* 10/2015 Henderson ............ G09B 19/003 434/257

FOREIGN PATENT DOCUMENTS

| | | |
|---|---|---|
| JP | 2001-204001 | 7/2001 |
| JP | 2004-361996 | 12/2004 |
| JP | 2006-236002 | 9/2006 |
| JP | 2006-345199 | 12/2006 |

OTHER PUBLICATIONS

"How To: Disable JavaScript to Speed up MobileSafari on the iPhone"; Rene Ritchie; <http://www.imore.com/how-to-disable-javascript-to-speed-up-mobilesafari-on-the-iphone>; Aug. 29, 2008.*

"Bandwidth Media Queries"; Chris Coyier; css-tricks.com; <https://css-tricks.com/bandwidth-media-queries/>; Published Mar. 28, 2012.*

"Goose—Article Extractor"; Jim Plush; <https://github.com/jiminoc/goose>; published prior to Dec. 6, 2013.*

"HTML5 A Vocabulary and associated APIs for HTML and XHTML"; <http://www.w3.org/TR/html5/embedded-content-0.html>; Mar. 20, 2014; 184 pages.*

"How To Make Your Websites Faster On Mobile Devices"; Johan Johansson; Smashing Magazine; <https://www.smashingmagazine.com/2013/04/build-fast-loading-mobile-website/>; published Apr. 3, 2013 (Year: 2013).*

The World Wide Web Consortium (W3C), "HTML5 A vocabulary and associated APIs for HTML and XHTML W3C Candidate Recommendation Feb. 4, 2014", http://www.w3.org/TR/html5/embedded-content-0.html#the-source-element, Mar. 20, 2014, 184 pages.

* cited by examiner

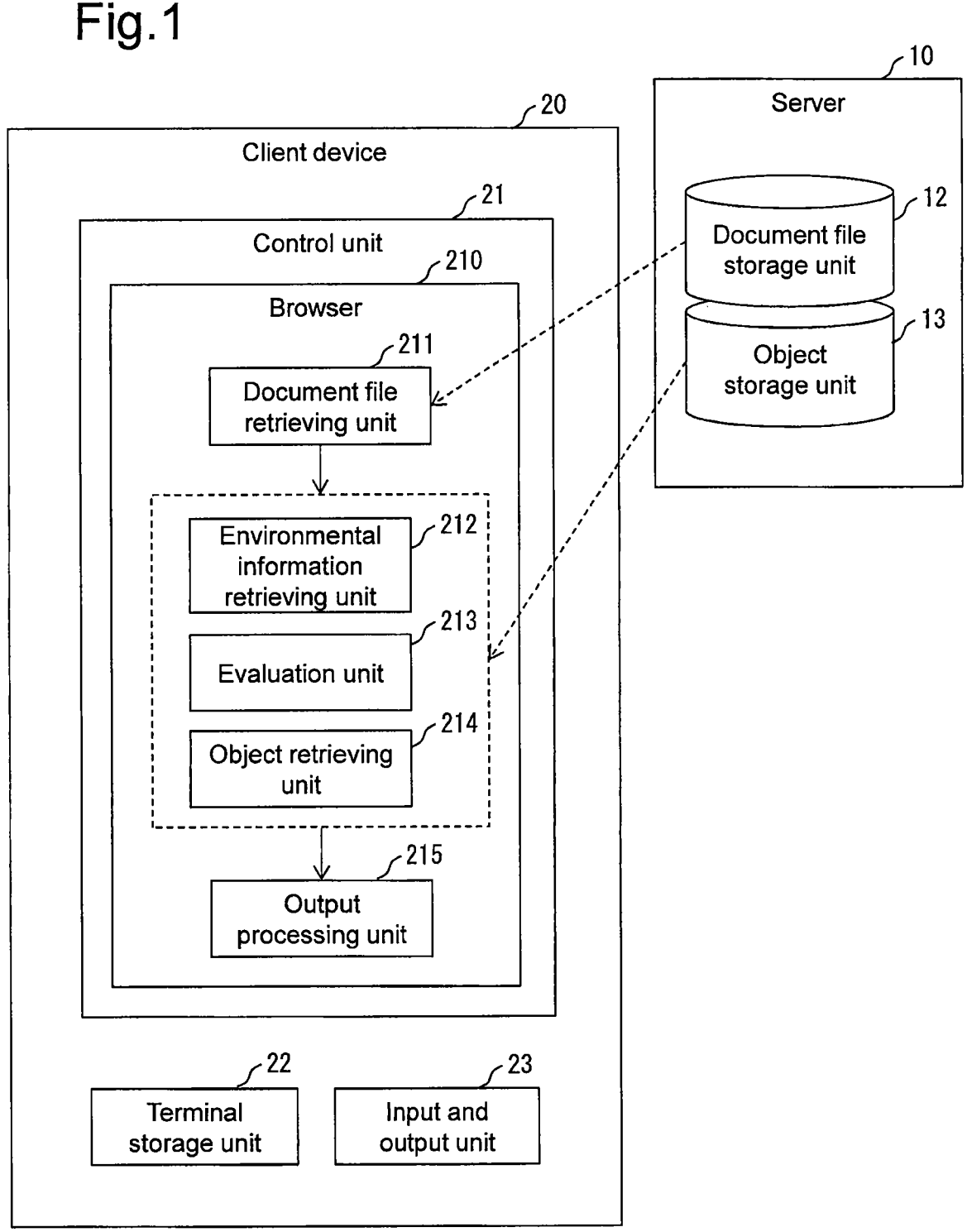

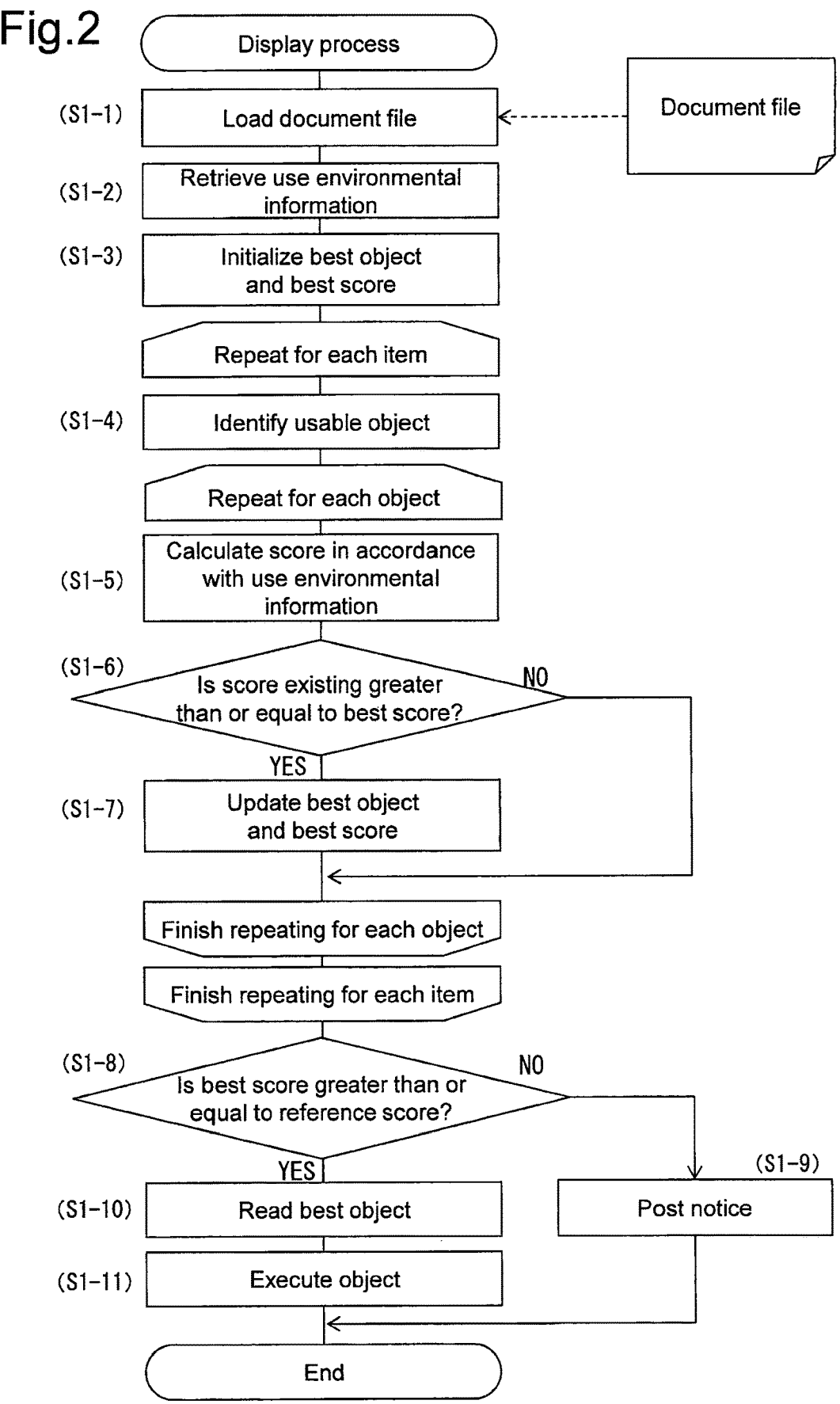

Fig.3

```
function isAndroid() {
  // A real implementation will make this
  // properly of course.
  return true;
}
```
501

```
function MP3(pURL) {
  // Load the MP3 data
} function PCM(pURL) {
  // Load the PCM data
}
```

```
function MP3Checker(pMimeType) {
  if (pMimeType === 'audio/mpeg') {
    return {
      impl: MP3,
      score: isAndroid ? 30 : 10
    };
  } else {
    return null;
  }
}
```
502

```
function PCMChecker(pMimeType) {
  if (pMimeType === 'audio/wave') {
    return {
      impl: PCM,
      score: 20
    };
  } else {
    return null;
  }
}
```
503

```
var mImpls = [
  MP3Checker,
  PCMChecker
];
```

```
/**
 * The Manifest class
 */
function Manifest() {
  this.items = {};
}

Manifest.prototype.addURL = function(pId, pURL, pMimeType) {
  var tItem = this.items[pId];

if (tItem === void 0) {
    tItem = this.items[pId] = {};
  } tItem[pMimeType] = {
    url: pURL,
    impl: null
  };
};

Manifest.prototype.get = function(pId) {
  return this.items[pId].impl;
};
```

Fig.5

```
Manifest.prototype.load = function() {                          521
  for (var tId in this.items) {
    var tItem = this.items[tId];
    var tBestScore = 0;
    var tBestImpl = null;
```

```
    for (var tMimeType in tItem) {                              522
      for (var i = 0; i < mImpls.length; i++) {
        var tResult = mImpls[i](tMimeType);

if (tResult !== null && tResult.score >= tBestScore) {
          tBestScore = tResult.score;
          tBestImpl = tResult.impl;
        }
      }
    ]
```

```
    if (tBestImpl !== null) {                                   523
      // We found the best implementation!
      // Pass the URL to the constructor.
      tItem.impl = new tBestImpl(tItem[tMimeType].url);
      // We can now access this via manifest.get(tId);
    } else {
      // Nothing can handle this content!
    }
  }
};
```

```
// Create a new manifest.
var tManifest = new Manifest();
```

```
// Add the resources to the manifest.                           524
// Notice how there are two BGM's to choose from
tManifest.addURL('SE', 'http://MYURL.com/se.mp3', 'audio/mpeg');
tManifest.addURL('BGM', 'http://MYURL.com/bgm.wav', 'audio/wave');
tManifest.addURL('BGM', 'http://MYURL.com/bgm.mp3', 'audio/mpeg');
```

```
// Load will automatically choose the best implementations.     525
// In this case, it will only load the SE file, and the MP3 version
// of the BGM file if on Android, but the PCM version otherwise.
tManifest.load();
```

```
// This will return an instance of the MP3 class.
var tBGM = tManifest.get('BGM');
```

DEVICE, MEDIUM, AND METHOD FOR RETRIEVING OBJECT

BACKGROUND

The present disclosure relates to a device, a medium, and a method for retrieving an object to be used in a client device.

These days, a variety of contents is provided to users who use computer devices such as smart phones. Such contents are often provided by means of web pages. Such web pages are written in a markup language such as HTML (HyperText Markup Language).

Some standards that can provide various media content such as audio and video on a web page have also been disclosed. For example, refer to "HTML5 A vocabulary and associated APIs for HTML and XHTML W3C Candidate Recommendation 4 Feb. 2014" by The World Wide Web Consortium (W3C). By this standard, content resources of various codecs can be specified by a source element such as an audio element and a video element. This source element has "src," "type," and "media" as content attributes. The "src" attribute provides an address of a media resource (URL). The "type" attribute indicates a MIME (Multipurpose Internet Mail Extension) type of resource. The "media" attribute indicates a media type serving as a target of the media resource. Based on the "type" attribute and the "media" attribute, whether the media resource can be played back can be determined before retrieving the media resource.

SUMMARY

By the above standard, media resources of a plurality of codecs can be specified by the source element. In a case of playing back content (such as an audio file), a browser retrieves content which can be played back in source code in the order written in the source code (in the order of "head," "audio tag of body," and "footer").

In a case where a plurality of audio files that can be played back is written in the source code, an audio file written in the first part of the source code (such as the beginning of body) is played back. Therefore, in a case where an optimal audio file is written in the latter part of the source code (such as the end of body), the browser cannot play back this file.

An objective of the present disclosure is to provide a device, a medium, and a method for retrieving a proper object in a client device.

To achieve the foregoing objective and in accordance with one aspect of the present disclosure, a device that includes a circuit is provided, in which the circuit is configured to: retrieve a markup language file including evaluation logic in accordance with a type of an object and output the markup language file as a web page; identify an item to be used on a web page, address information for retrieving a usable object for the item, and the object type; retrieve an evaluation result for the usable object produced by the evaluation logic for each item; identify the object to be used in accordance with the evaluation result and identify address information of the object; and retrieve and execute an object based on the address information.

In accordance with another aspect, the present disclosure provides a non-transitory computer-readable storage medium including a program. When the program is executed by a device, the program causes the device to: retrieve a markup language file including evaluation logic in accordance with a type of an object and output the markup language file as a web page; identify an item to be used on a web page, address information for retrieving a usable object for the item, and the object type; retrieve an evaluation result for the usable object produced by the evaluation logic for each item; and identify the object to be used in accordance with the evaluation result and identify address information of the object.

In accordance with a yet another aspect, the present disclosure provides a method for retrieving an object. The method includes: retrieving a markup language file including evaluation logic in accordance with a type of an object and outputting the markup language file as a web page; identifying types of an item to be used on a web page, address information for retrieving a usable object for the item, and the object; retrieving an evaluation result for the usable object produced by the evaluation logic for each item; identifying the object to be used in accordance with the evaluation result and identifying address information of the object; and retrieving and executing an object based on the address information.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 1 is a schematic system diagram of an embodiment of the present embodiment;

FIG. 2 is an explanatory diagram of a processing procedure of the present embodiment;

FIGS. 3 to 5 are diagrams for respectively illustrating part of source code examples of the present embodiment.

DETAILED DESCRIPTION OF THE PREFERRED EMBODIMENTS

Figure 6:
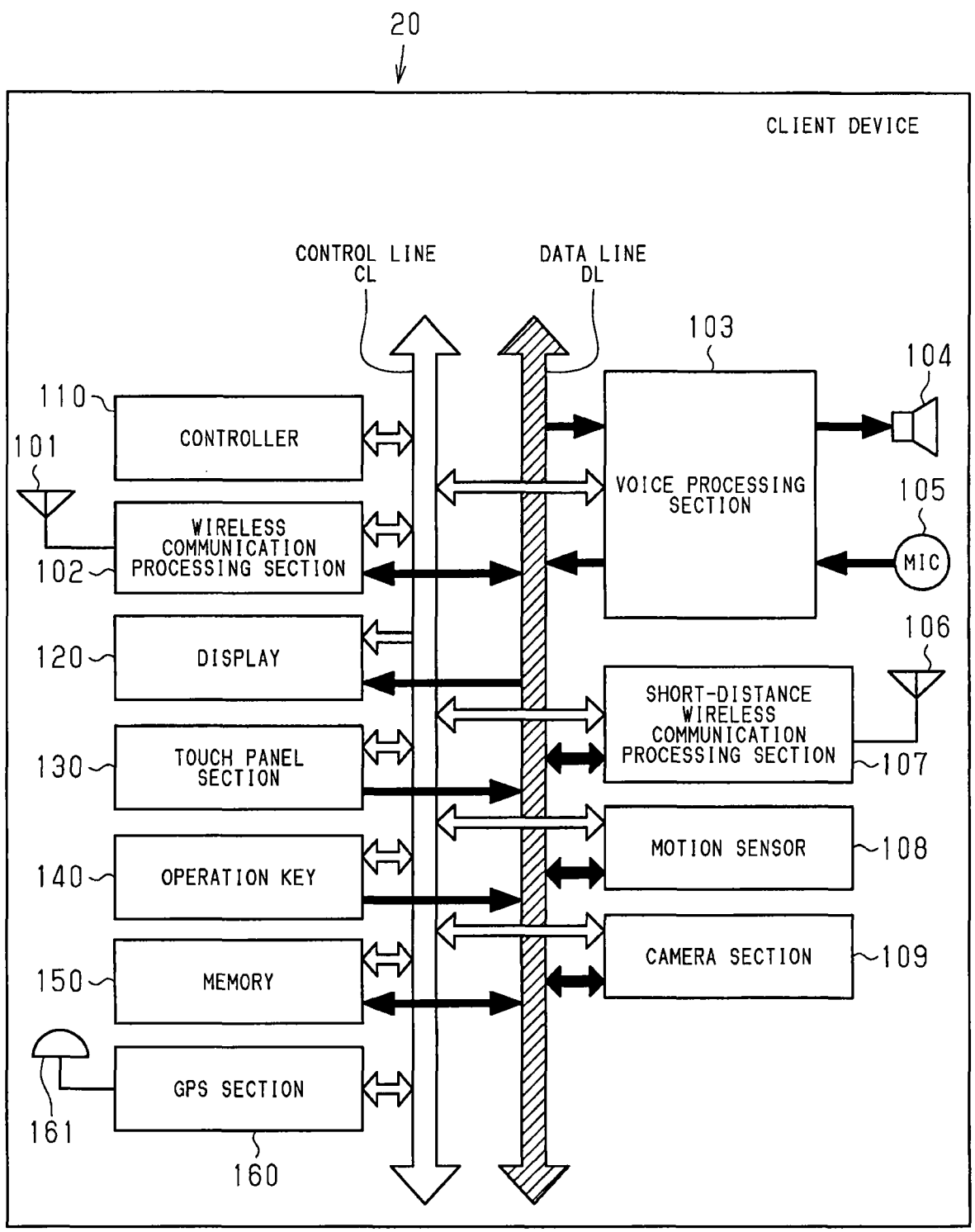
FIG. 6 is a more detailed hardware block diagram illustrating an exemplary electronic device according to the embodiment.

Hereinafter, one embodiment of an object retrieving program will be described with reference to FIGS. 1 to 5.

In the present embodiment, as shown in FIG. 1, a case is assumed in which a client device 20 serving as a computer device retrieves and plays back an object (content of an audio file and a video file and the like) based on a document file (markup language file) retrieved from a server 10.

The server 10 includes a document file storage unit 12 and an object storage unit 13.

The document file storage unit 12 stores a document file to be provided to the client device 20. This document file is written in a markup language. This document file includes description for realizing various functions in the client device 20 as discussed below. In the present embodiment, the document file includes description for realizing an environmental information retrieving unit 212, an evaluation unit 213, and an object retrieving unit 214, which will be discussed below.

Further, this document file includes information relating to an item to be used at the time of output (item information). The item information (object information) identifies an retrievable object such as audio and video. This item information includes information relating to an item ID, an retrieving location, and a type.

The item ID is an identifier for identifying an item to be used on the document file (such as "BGM").

The retrieving location is address information in which an object available in a case of using this item is stored such as Uniform Resource Locator (URL).

The type refers to the type of the object. As the type, for example, standards such as mpeg (Moving Picture Experts Group) and wave (standard data format of PCM (pulse code modulation) audio source used in Windows (Registered Trademark)) can be used.

The object storage unit 13 stores objects to be provided to the client device 20 based on the document file (markup language file). In the present embodiment, as the objects, for example, media content of an audio file and a video file are used.

The client device 20 is a computer to be used by a user who views the document file (information processing device such as a smart phone), and functions as an object retrieving device. This client device 20 includes a control unit 21, which has a CPU and a memory (a RAM and a ROM), a device storage unit 22, and an input and output unit 23.

The device storage unit 22 records various settings and programs to be used in the client device 20. In the present embodiment, the device storage unit 22 stores a browser (program) that displays a file written in a markup language.

The input and output unit 23 is formed by a touch panel display or the like and performs an input and an output of data.

The control unit 21 starts up a browser 210 by executing a browser program stored in the device storage unit 22. This browser 210 includes a document file retrieving unit 211 and an output processing unit 215.

The document file retrieving unit 211 reads the document file (markup language file).

The output processing unit 215 outputs the markup language file to the input and output unit 23 as a web page.

Further, the browser 210 executes the description included in this document file. By executing this description, the browser 210 realizes the environmental information retrieving unit 212, the evaluation unit 213, and the object retrieving unit 214.

The environmental information retrieving unit 212 retrieves information relating to the environment of the client device 20. In this case, the unit retrieves configuration information of hardware installed in the client device 20, configuration information of software (device attribute), information relating to a communication environment, device identifying information, and the like.

The evaluation unit 213 evaluates compatibility of the object retrievable from the server 10 in a case where the object is output in the client device 20. The object may be, for example, the content of the audio file and the video file and the like. For evaluating the compatibility, the evaluation unit 213 holds predetermined evaluation logic that uses environmental information of the client device 20 and the object type as parameters. The evaluation unit 213 records information relating to an evaluation result for a usable object such as the best score and the best object in the memory. Further, the evaluation unit 213 holds data relating to a reference score for determining whether the object can be used.

The object retrieving unit 214 retrieves an object serving as an appropriate object such as the best object having the highest compatibility from the server 10 based on the evaluation logic.

Next, with reference to FIG. 2, processing in a case of outputting the document file in the client device 20 will be described.

First, the control unit 21 of the client device 20 executes a process for loading the document file (Step S1-1). Specifically, a URL of the document file desired to be output is input to the browser 210 of the control unit 21. In this case, the document file retrieving unit 211 of the browser 210 requests the document file of the URL to the server 10. The browser 210 retrieves the document file from the server 10. Here, a case is assumed where the document file is a markup language file. This document file includes the description for realizing the environmental information retrieving unit 212, the evaluation unit 213, and the object retrieving unit 214. Further, this document file includes the information relating to the item to be used at the time of output (such as BGM).

Next, the control unit 21 executes a process for retrieving use environmental information (Step S1-2). Specifically, the browser 210 retrieves the use environmental information in the client device 20 by the environmental information retrieving unit 212. For example, the use environmental information is information that identifies an operating system (OS) in system information held by the client device 20 that uses the document file.

Next, the control unit 21 executes a process for initializing the best object and the best score (Step S1-3). Specifically, the browser 210 resets the best object and the best score recorded in the memory by the evaluation unit 213.

The control unit 21 identifies items included in the loaded document file as processing target items, and repeats the following processing for each of the processing target items.

First, the control unit 21 executes a process for identifying usable objects (Step S1-4). Specifically, the browser 210 identifies the objects prepared on the server 10 in relation to the processing target item by the evaluation unit 213. In this case, the control unit 21 identifies the usable objects based on the item information set in the document file, and repeats the following process for each of the identified objects.

The control unit 21 executes a process for calculating a score in accordance with the use environmental information (Step S1-5). Specifically, the browser 210 applies the evaluation logic to the objects of the processing target item and calculates the score of the objects by the evaluation unit 213.

Next, the control unit 21 executes a process for determining whether the calculated score is greater than or equal to the current best score (Step S1-6). Specifically, the browser 210 repeats comparison between the calculated score and the best score recorded in the memory for each of the usable objects by the evaluation unit 213.

In a case of determining that the calculated score is greater than or equal to not the best score (in a case of "NO" in Step S1-6), the process for this object is finished.

In a case of determining that the calculated score is greater than or equal to the best score (in a case of "YES" in Step S1-6), the control unit 21 executes a process for updating the best object and the best score (Step S1-7). Specifically, the browser 210 records the object of a newly calculated score in the memory as the best object by the evaluation unit 213. Further, the browser 210 records the calculated score in the memory as the best score. The above process is repeated for all usable objects.

For all the items included in the document file, the above process is repeated.

Next, the control unit 21 executes a process for determining whether the best score is greater than or equal to the reference score (Step S1-8). Specifically, the browser 210 compares the best score recorded in the memory with the reference score for each of the items by the evaluation unit 213.

In a case of determining that the best score is less than the reference score (in a case of "NO" in Step S1-8), the control unit 21 executes a process for posting a notice (Step S1-9). Specifically, the browser 210 outputs a display message that "there is no appropriate object" for this item to the input and output unit 23.

Meanwhile, in a case of determining that the best score is greater than or equal to the reference score (in a case of "YES" in Step S1-8), the control unit 21 executes a process for reading the best object (Step S1-10). Specifically, the browser 210 identifies an retrieving location (URL) of the best object for this item by using the item information by the object retrieving unit 214. With the use of this retrieving location, the object is retrieved from the server 10.

Next, the control unit 21 executes a process for executing the object (Step S1-11). Specifically, the browser 210 executes the retrieved object by the output processing unit 215.

Next, with reference to FIGS. 3 to 5, code (program) to be provided to the client device 20 by the document file (markup language file) will be described. A case is assumed in which a "Manifest" object written in JavaScript (Registered Trademark) is provided to the client device 20. One "Manifest" object will be described in in three parts, that is, a first part 500 (FIG. 3), a second part 510 (FIG. 4), and a third part 520 (FIG. 5).

The first part 500 shown in FIG. 3 includes descriptions 501 to 503.

In the description 501, a process for returning a value in accordance with the environment of the client device 20 is performed. In a case of the client device 20 that uses Android® as an OS, the value "true" is returned.

The descriptions 502, 503 include functions for evaluating the object.

In the description 502, a function that gives an evaluation score for an MP3 file (mpeg) is set. The function gives "30" in a case of a device in which a device attribute is Android®, and "10" in a case of a device of any other device attributes to the MP3 file.

In the description 503, a function that gives an evaluation score for a PCM file (wave) is set. This function gives "20" to the PCM file.

The second part 510 shown in FIG. 4 defines prototypes "addURL," "get" in "Manifest."

The prototype "addURL" defines the item information (the item ID, the retrieving location (URL), and the type) of the usable objects.

The prototype "get" defines retrieving and implementation of the objects of the item ID.

The third part 520 shown in FIG. 5 defines a prototype "load" in "Manifest." Further, the third part 520 creates a new object of "Manifest" based on the prototype.

The prototype "load" includes descriptions 521 to 525.

The description 521 realizes a function of resetting the memory in which the best score is recorded and initializing the best score.

The description 522 realizes a function of evaluating the usable objects for each of the items by using the evaluation logic. In accordance with the calculated score, the best score and the best item recorded in the memory are updated and recorded.

The description 523 realizes a function of outputting the evaluation result. The object of which the best score is recorded in the memory is output as the evaluation result.

The description 524 sets the usable objects. For example, in a case of audio, two audio files ("bgm.mp3" (MP3 format) and "bgm.wav" (PCM format)) are used for the item ID "BGM."

The description 525 is a setting for downloading the object of the best score for each of the items by using the URL of the item information.

The evaluation unit 213 is realized by the descriptions 521 to 524, and the object retrieving unit 214 is realized by the description 525.

The present embodiment has the following advantages.

(1) In the present embodiment, the document file includes the description for realizing the environmental information retrieving unit 212. The environmental information retrieving unit 212 retrieves the information relating to the environment of the client device 20. Thereby, the information relating to the environment of the client device can be retrieved.

(2) In the present embodiment, the document file includes the description for realizing the evaluation unit 213. This evaluation unit 213 evaluates the compatibility of the object retrievable from the server 10 in a case where the object is output and played back in the client device 20. Thereby, even in a case where there is a plurality of usable objects, an appropriate object, that is, an object compatible with the environment of the client device can be used based on the evaluation logic. For example, even in a case where information relating to the most suitable object is written in the latter order in the markup language file, this object can be used.

(3) In the present embodiment, the document file includes the description for realizing the object retrieving unit 214. The object retrieving unit 214 retrieves the best object having the highest compatibility from the server 10. Thereby, the object having high compatibility among the objects can be efficiently downloaded.

The above embodiment may be modified as follows.

In the above embodiment, the control unit 21 executes the process for loading the document file (Step S1-1). The browser 210 retrieves the document file (web page) from the server 10. The document file is not limited to the web page as long as the document file is a file written in a markup language.

In the above embodiment, for example, the media content of the audio file and the video file is used as the object. This object is not limited to the audio file. For example, a plurality of programs can also be provided as the objects for one item. In this case, the control unit 21 also identifies the best object (best program) in the client device 20 in accordance with the type of programs and downloads the best object (best program).

In the above embodiment, the control unit 21 executes the process for retrieving the use environmental information (Step S1-2). The environmental information is information that identifies the OS. The environmental information for identifying the best object is not limited to the OS. The information relating to the environment of the hardware installed in the client device 20 (the configuration information of the hardware), the information relating to the environment of the software (the configuration information of the software), the information relating to the communication environment, device type information, and the device identifying information can also be used.

As the environment of the hardware, a CPU processing ability, a memory capacity, and the like can be used. In this case, the environmental information retrieving unit 212 holds evaluation logic that uses the hardware environment information as a parameter. The environmental information retrieving unit 212 retrieves a processing ability of the hardware installed in the client device 20 (hardware environment information). Thereby, in accordance with the processing ability in the hardware of the client device 20, an appropriate object can be identified.

As the environment of the software, a driver that plays back the content, existence/non-existence of a plug-in, and the like can be used. In this case, the environmental information retrieving unit 212 holds evaluation logic that uses the software environment information as a parameter. The environmental information retrieving unit 212 retrieves the type of software installed in the client device 20 (software environment information). Thereby, in accordance with an installation state of the software compatible with the object, an appropriate object can be identified.

As the communication environment, communication speed, a communication method, and the like can be used. In this case, the environmental information retrieving unit 212 holds evaluation logic that uses the communication environment information as a parameter. The environmental information retrieving unit 212 retrieves information relating to a communication state in the client device 20. Thereby, in consideration of a downloading time of the object, an appropriate object can be identified.

As the device type information, device manufacturer information and model number information can be used. In a device of a particular manufacturer or model number, failure is sometimes caused at the time of executing the object. In this case, the environmental information retrieving unit 212 holds a consistency list in which existence/non-existence of consistency is recorded in association with the device type. The environmental information retrieving unit 212 identifies the device type of client device 20 and refers to the consistency list on the existence/non-existence of the consistency for the identified device type. Corresponding to such failure information, an appropriate object having consistency can be identified.

In the above embodiment, the server 10 stores the object to be used in the document file in the object storage unit 13 of the server 10. The storage location of the object is not limited to the server 10 in which the document file is stored. The identification of the storage location is also not limited to the URL but the storage location may be identified by using binary data.

In each of the above embodiments, the document file includes the description for realizing the environmental information retrieving unit 212, the evaluation unit 213, and the object retrieving unit 214. This description is not limited to the case where the description is included in the document file. An retrieving location of each description may be set in the document file and the description may be retrieved from this retrieving location.

FIG. 6 is a more detailed block diagram illustrating an exemplary client device 20 according to certain embodiments of the present disclosure. In certain embodiments, client device 20 may be a smartphone. However, the skilled artisan will appreciate that the features described herein may be adapted to be implemented on other devices (e.g., a laptop, a tablet, a server, an e-reader, a camera, a navigation device, etc.). The exemplary client device 20 of FIG. 6 includes a controller 110 and a wireless communication processor 102 connected to an antenna 101. A speaker 104 and a microphone 105 are connected to a voice processor 103.

The controller 110 is an example of the control unit 21 shown in FIG. 1 and may include one or more Central Processing Units (CPUs), and may control each element in the client device 20 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium. As described above in relation to FIG. 1, the controller 110 may execute instructions allowing the controller 110 to function as the display control unit 211, operation management unit 212 and game management unit 213 depicted in FIG. 1.

The memory 150 is an example of the storage unit 22 shown in FIG. 1 and includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto. As disclosed in relation to FIG. 1, the memory 150 may be configured to store the battle view information, operation view information and list of commands.

The client device 20 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the client device 20 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals retrieved by the microphone 105.

The exemplary client device 20 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the client device 20. The display 120 may additionally display a GUI for a user to control aspects of the client device 20 and/or other devices. Further, the display 120 may display characters and images received by the client device 20 and/or stored in the memory 150 or accessed from an external device on a network. For example, the client device 20 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

One or more of the display 120 and the touch panel 130 are examples of the touch panel display 25 depicted in FIG. 1 and described above.

In certain aspects of the present disclosure, the touch panel 130 may be disposed adjacent to the display 120 (e.g., laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the client device 20. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the client device 20, based on the detected finger position. For example, the touch panel 130 sensors may detect a plurality of fingers on the left side of the client device 20 (e.g., on an edge of the display 120 or on the protective casing), and detect a single finger on the right side of the client device 20. In this exemplary scenario, the controller 110 may determine that the user is holding the client device 20 with his/her right hand because the detected grip pattern corresponds to an expected pattern when the client device 20 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the client device 20 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The client device 20 may include a motion sensor 108. The motion sensor 108 may detect features of motion (i.e., one or more movements) of the client device 20. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the client device 20. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the client device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The client device 20 may include a camera section 109, which includes a lens and shutter for capturing photographs of the surroundings around the client device 20. In an embodiment, the camera section 109 captures surroundings of an opposite side of the client device 20 from the user. The images of the captured photographs can be displayed on the display panel 120. A memory section saves the captured photographs. The memory section may reside within the camera section 109 or it may be part of the memory 150. The camera section 109 can be a separate feature attached to the client device 20 or it can be a built-in camera feature.

The invention claimed is:

1. A device, comprising:
   circuitry configured to
   retrieve a markup language file from a server;
   identify, based on the markup language file, an item to be used on a web page, a plurality of objects corresponding to the item, address information for retrieving each object, and an object file video format corresponding to each object;
   determine an evaluation score for each of the plurality of objects based on the identified object file video format of said each of the plurality of objects and use environmental information identifying a use environment of the device;
   identify a first object of the plurality of objects as an object to be used based on the evaluation scores;
   retrieve only the first object of the plurality of objects from the server based on the identifying; and
   execute the first object based on the address information.

2. The device of claim 1, wherein the use environmental information comprises information indicating a software configuration of the device on which the web page is displayed.

3. The device of claim 1, wherein the use environmental information comprises information indicating a hardware configuration of the device on which the web page is displayed.

4. The device of claim 1, wherein the use environmental information comprises information indicating a communication environment of the device on which the web page is displayed.

5. The device of claim 1, wherein the use environmental information comprises information indicating a device type of the device on which the web page is displayed.

6. The device of claim 1, wherein the circuitry is configured to:
   compare the evaluation scores for each of the plurality of objects; and
   identify an object of the plurality of objects that has a highest evaluation score as the object to be used.

7. The device of claim 1, wherein the object is media content provided on the web page.

8. A non-transitory computer-readable storage medium including a program, which when executed by a device, causes the device to:
   retrieve a markup language file from a server;
   identify, based on the markup language file, an item to be used on a web page, a plurality of objects corresponding to the item, address information for retrieving each object, and an object file video format corresponding to each object;
   determine an evaluation score for each of the plurality of objects based on the identified object file video format of said each of the plurality of objects and use environmental information identifying a use environment of the device;
   identify a first object of the plurality of objects as an object to be used based on the evaluation scores;
   retrieve only the first object of the plurality of objects from the server based on the identifying; and
   execute the first object based on the address information.

9. The non-transitory computer-readable storage medium of claim 8, wherein the use environmental information comprises information indicating a software configuration of the device on which the web page is displayed.

10. The non-transitory computer-readable storage medium of claim 8, wherein the use environmental information comprises information indicating a hardware configuration of the device on which the web page is displayed.

11. The non-transitory computer-readable storage medium of claim 8, wherein the use environmental information comprises information indicating a communication environment of the device on which the web page is displayed.

12. The non-transitory computer-readable storage medium of claim 8, wherein the use environmental information comprises information indicating a device type of the device on which the web page is displayed.

13. The non-transitory computer-readable storage medium of claim 8, wherein the program further causes the device to:
    compare the evaluation scores for each of the plurality of object; and
    identify an object of the plurality of objects that has a highest evaluation score as the object to be used.

14. The non-transitory computer-readable storage medium of claim 8, wherein the object is media content provided on the web page.

15. A method, comprising:
    retrieving a markup language file from a server;
    identifying, based on the markup language file, an item to be used on a web page, a plurality of objects corresponding to the item, address information for retrieving each object, and an object file video format corresponding to each object;
    determine an evaluation score for each of the plurality of objects based on the identified object file video format of said each of the plurality of objects and use environmental information identifying a use environment of a device;
    identifying a first object of the plurality of objects as an object to be used based on the evaluation scores;
    retrieving only the first object of the plurality of objects from the server based on the identifying; and
    executing the first object based on the address information.

16. The method of claim 15, wherein the use environmental information comprises information indicating a software configuration of a device on which the web page is displayed.

17. The method of claim 15, wherein the use environmental information comprises information indicating a hardware configuration of a device on which the web page is displayed.

18. The method of claim 15, wherein the use environmental information comprises information indicating a communication environment of a device on which the web page is displayed.

19. The method of claim 15, wherein the use environmental information comprises information indicating a device type of a device on which the web page is displayed.

20. The method of claim 15, further comprising:
   comparing the evaluation scores for each of the plurality of objects; and
   identifying an object of the plurality of objects that has a highest evaluation score as the object to be used.

21. The method of claim 15, wherein the object is media content provided on the web page.

* * * * *